US011652433B2

(12) United States Patent
Gomi et al.

(10) Patent No.: US 11,652,433 B2
(45) Date of Patent: May 16, 2023

(54) MOTOR ACTUATOR FOR ON-VEHICLE EQUIPMENT

(71) Applicant: Hitachi Astemo, Ltd., Hitachinaka (JP)

(72) Inventors: Hiroyoshi Gomi, Hitachinaka (JP);
Masaki Itabashi, Hitachinaka (JP);
Yawara Kato, Hitachinaka (JP);
Kazutoshi Tanabe, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 119 days.

(21) Appl. No.: 17/428,117

(22) PCT Filed: Jan. 14, 2020

(86) PCT No.: PCT/JP2020/000846
§ 371 (c)(1),
(2) Date: Aug. 3, 2021

(87) PCT Pub. No.: WO2020/162112
PCT Pub. Date: Aug. 13, 2020

(65) Prior Publication Data
US 2022/0123684 A1 Apr. 21, 2022

(30) Foreign Application Priority Data
Feb. 5, 2019 (JP) .............................. JP2019-018574

(51) Int. Cl.
*H02P 27/08* (2006.01)
*H02P 23/14* (2006.01)

(52) U.S. Cl.
CPC .............. *H02P 27/08* (2013.01); *H02P 23/14* (2013.01)

(58) Field of Classification Search
CPC ........ H02P 29/00; H02P 29/02; H02P 29/024; H02P 29/0241; H02P 29/025;
(Continued)

(56) References Cited

U.S. PATENT DOCUMENTS

| 8,499,885 B1 | 8/2013 | Satou et al. |
| 2011/0273122 A1 | 11/2011 | Murata et al. |

(Continued)

FOREIGN PATENT DOCUMENTS

| JP | 2011-239489 A | 11/2011 |
| JP | 2013-183462 A | 9/2013 |

(Continued)

OTHER PUBLICATIONS

International Search Report dated Feb. 18, 2020 issued in corresponding International Application No. PCT/JP2020/000846, with English translation, 5 pages.

(Continued)

*Primary Examiner* — Antony M Paul
(74) *Attorney, Agent, or Firm* — Foley & Lardner LLP

(57) ABSTRACT

A motor actuator of the present invention includes, between a battery and an inverter, a first solid state relay and a second solid state relay in which directions of parasitic diodes are opposite to each other. When supply of power from the battery to the inverter is to be interrupted, the first solid state relay is brought into an OFF state or all of a plurality of field effect transistors are brought into the OFF state, and then the second solid state relay is brought into the OFF state.

10 Claims, 4 Drawing Sheets

(58) Field of Classification Search
CPC ...... H02P 29/028; H02P 29/032; H02P 29/67; H02P 29/68; H02P 25/00; H02P 25/022; H02P 25/062; H02P 25/064; H02P 27/00; H02P 27/04; H02P 27/06; H02P 27/08; H02P 21/00; H02P 21/20; H02P 21/36; H02P 7/00; H02P 7/04; H02P 7/29; H02P 6/00; H02P 6/04; H02P 6/06; H02P 6/08; H02P 3/00; H02P 3/12; H02P 3/22; H02P 1/10

See application file for complete search history.

(56) References Cited

U.S. PATENT DOCUMENTS

| | | | |
|---|---|---|---|
| 2013/0181639 A1* | 7/2013 | Yamanaka | H02P 3/14 318/139 |
| 2015/0035464 A1 | 2/2015 | Maekawa et al. | |
| 2020/0021233 A1 | 1/2020 | Kimura et al. | |

FOREIGN PATENT DOCUMENTS

| JP | 2013-198202 A | 9/2013 |
|---|---|---|
| WO | WO-2018/173469 A1 | 9/2018 |

OTHER PUBLICATIONS

Written Opinion of the International Searching Authority dated Feb. 18, 2020 issued in corresponding International Application No. PCT/JP2020/000846, with English translation, 11 pages.

* cited by examiner

MOTOR ACTUATOR FOR ON-VEHICLE EQUIPMENT

TECHNICAL FIELD

The present invention relates to a motor actuator for on-vehicle equipment as typified by an electric power steering device or the like.

BACKGROUND ART

A motor drive device disclosed in Patent Literature 1 includes, between an inverter circuit and a motor, a fail-safe circuit including semiconductor switching elements for respective phases. The semiconductor switching elements are each configured to interrupt voltage supply from the inverter circuit to the motor. When an abnormality is detected, the motor drive device carries out control to turn off all of semiconductor switching elements of the inverter circuit, and then, at a time point at which a predetermined time period has elapsed, the motor drive device carries out control to turn off all of the semiconductor switching elements of the fail-safe circuit.

CITATION LIST

Patent Literature

PTL 1: JP 2011-239489 A

SUMMARY OF INVENTION

Technical Problem

However, in a case in which the motor is in a high rotation state when the motor actuator interrupts a current-supply path to the motor based on detection of an abnormality or the like, a counter-electromotive force generated by the motor may exceed an absolute maximum rating of a circuit element included in the motor actuator, which may result in causing secondary circuit-element failure.

Solution to Problem

The present invention has an object to provide a motor actuator for on-vehicle equipment, which is capable of interrupting power supply to a motor while suppressing failure of a circuit element due to a counter-electromotive force.

A motor actuator for on-vehicle equipment according to one embodiment of the present invention includes, between a battery and an inverter, a first solid state relay and a second solid state relay. The first solid state relay includes a first diode including a cathode arranged on the battery side and an anode arranged on the inverter side. The second solid state relay includes a second diode including a cathode arranged on the inverter side and an anode arranged on the battery side. When supply of power from the battery to the inverter is to be interrupted, the first solid state relay is brought into an OFF state or all of plurality of field effect transistors are brought into the OFF state, and then the second solid state relay is brought into the OFF state.

According to one embodiment of the present invention, it is possible to interrupt power supply to a motor while suppressing failure of a circuit element due to a counter-electromotive force.

DESCRIPTION OF EMBODIMENTS

Now, an embodiment of the present invention is described with reference to the drawings.

In this embodiment, a motor actuator configured to generate a steering assist force in an electric power steering device is described as an example of a motor actuator for on-vehicle equipment. However, the on-vehicle equipment is not limited to the electric power steering device, and may be a variable compression ratio mechanism of an internal combustion engine or the like.

Figure 1:
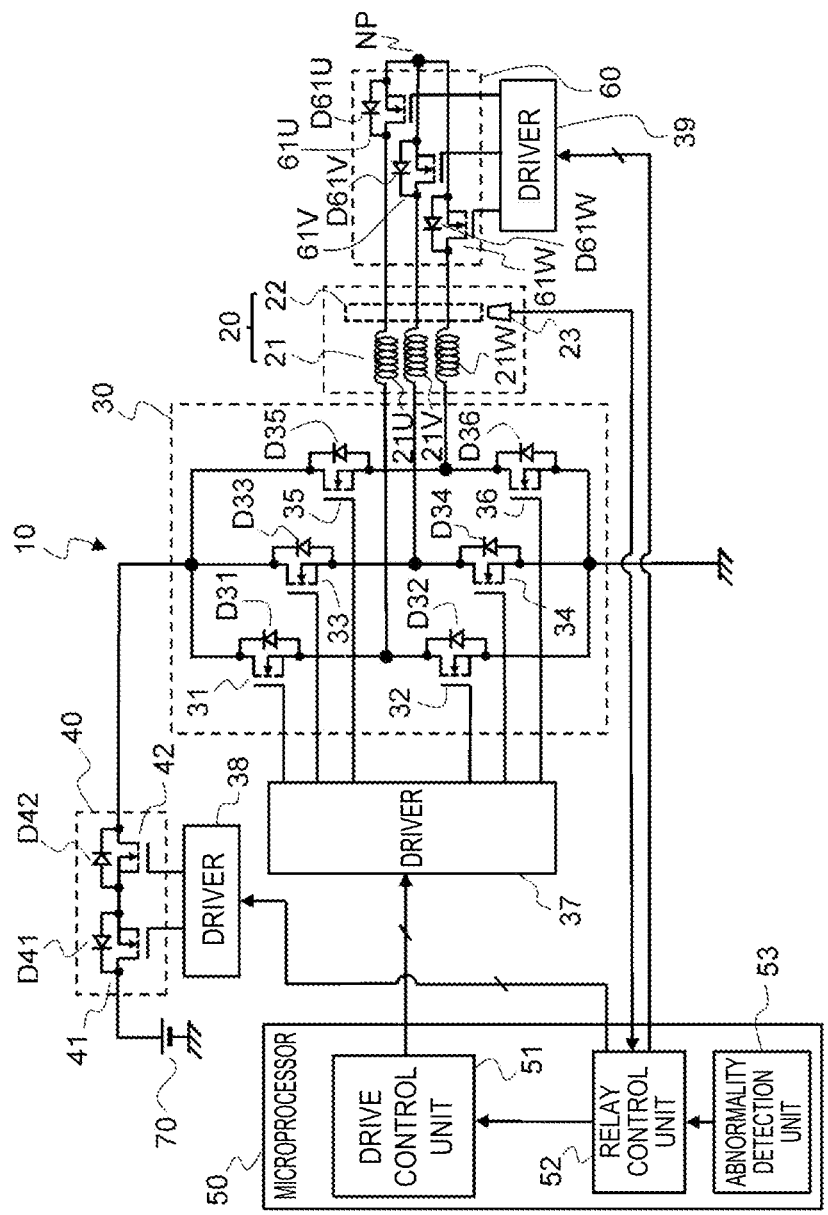
FIG. 1 is a circuit diagram for illustrating one mode of a motor actuator for on-vehicle equipment.

FIG. 1 is a circuit configuration diagram of a motor actuator 10 for an electric power steering device.

The motor actuator 10 includes a motor unit 20, an inverter 30, a solid state relay unit 40, a microprocessor 50, and a motor relay 60.

The motor unit 20 is a three-phase synchronous generator including a stator coil 21 and a motor rotor 22. The stator coil 21 includes a U-phase coil 21U, a V-phase coil 21V, and a W-phase coil 21W.

Further, the motor unit 20 includes a motor rotation sensor 23 configured to detect a rotational speed of the motor rotor 22.

The inverter 30 includes a bridge circuit including a plurality of field effect transistors. The inverter 30 is to be supplied with power from a battery 70 to control current supply to the stator coil 21.

The bridge circuit of the inverter 30 is a three-phase bridge circuit including three sets of field effect transistors 31 to 36 (semiconductor switching elements) configured to drive a U-phase, a V-phase, and a W-phase, respectively. As the field effect transistors 31 to 36 of the inverter 30, in this embodiment, N-channel MOSFETs are used.

The field effect transistors 31 to 36 include free-wheeling diodes D31 to D36, respectively. The free-wheeling diodes D31 to D36 are each a parasitic diode. Further, the free-wheeling diodes D31 to D36 each include an anode arranged on a potential ground side, and a cathode arranged on a positive electrode side of the battery 70.

The solid state relay unit 40 is provided between the battery 70 and the inverter 30, and is formed by connecting a first solid state relay 41 and a second solid state relay 42 in series to each other.

As the first solid state relay 41 and the second solid state relay 42, in this embodiment, MOSFETs being field effect transistors are used.

The first solid state relay 41 includes a first diode D41 being a parasitic diode. The first diode D41 includes a cathode arranged on the battery 70 side, and an anode arranged on the inverter 30 side.

Further, the second solid state relay 42 is provided between the first solid state relay 41 and the inverter 30.

The second solid state relay 42 includes a second diode D42 being a parasitic diode. The second diode D42 includes a cathode arranged on the inverter 30 side, and an anode arranged on the battery 70 side.

The first solid state relay 41 and the second solid state relay 42 in which directions of supplying currents through the parasitic diodes are mutually opposite to each other are connected in series to each other to form the solid state relay unit 40 (power relay). In this manner, even when the battery 70 serving as a power source is reversely connected, a flow of currents via the parasitic diodes of the solid state relay unit 40 can be suppressed, and thus the circuit can be protected from the reverse connection of the power source.

Instead of the arrangement of the solid state relays 41 and 42 of FIG. 1, the first solid state relay 41 can be arranged on the inverter 30 side, and the second solid state relay 42 can be arranged on the battery 70 side.

The motor relay 60 is provided between the inverter 30 and a neutral point NP of the stator coil 21, and is configured to switch between supply and interruption of current between the inverter 30 and the neutral point NP.

The motor relay 60 includes a first motor relay 61U, that is, a U-phase relay provided between the U-phase coil 21U and the neutral point NP, a second motor relay 61V, that is, a V-phase relay provided between the V-phase coil 21V and the neutral point NP, and a third motor relay 61W, that is, a W-phase relay provided between the W-phase coil 21W and the neutral point NP.

The motor relays 61U, 61V, and 61W are each a solid state relay using a MOSFET or the like, and include free-wheeling diodes D61U, D61V, and D61W, respectively. The free-wheeling diodes D61U, D61V, and D61W are each a parasitic diode. The free-wheeling diodes D61U, D61V, and D61W each include a cathode arranged on the inverter 30 side, and an anode arranged on the neutral point NP side.

Instead of the arrangement of the motor relays 61U, 61V, and 61W of FIG. 1, each of the motor relays 61U, 61V, and 61W can be arranged between corresponding one of the coils 21U, 21V, and 21W and the inverter 30.

The microprocessor 50 includes, in addition to a CPU, a ROM configured to store a processing program or the like, a RAM configured to temporarily store data, and further an input/output port.

Further, the microprocessor 50 includes, as software, functions serving as a drive control unit 51, a relay control unit 52, and an abnormality detection unit 53.

The drive control unit 51 is configured to generate a drive command signal for controlling drive of the inverter 30, and output the drive command signal to a driver 37 for the inverter 30, to thereby individually control switching of the field effect transistors 31 to 36 of the inverter 30.

In the electric power steering device, the drive control unit 51 is configured to calculate a target torque based on information such as a steering torque or a vehicle speed, and control the field effect transistors 31 to 36 of the inverter 30 through pulse width modulation control based on the target torque, to thereby control a generation torque of the motor unit 20, that is, a steering assist force.

The drive control unit 51 is capable of directly controlling the inverter 30 instead of controlling the inverter 30 via the driver 37.

Further, the abnormality detection unit 53 is configured to detect an abnormality of the motor actuator 10. For example, the abnormality detection unit 53 is configured to detect an abnormality such as a short circuit or an open circuit in the field effect transistors 31 to 36 of the inverter 30 based on phase current detection results or the like.

Further, the relay control unit 52 is configured to control, for example, when an abnormality is detected by the abnormality detection unit 53, the solid state relay unit 40 and the motor relay 60 via drivers 38 and 39, and control the field effect transistors 31 to 36 of the inverter 30 via the drive control unit 51, to thereby interrupt supply of power from the battery 70 to the inverter 30, that is, from the battery 70 to the motor unit 20.

Here, one mode of control of interrupting power supply to be carried out by the relay control unit 52 when an abnormality of the motor actuator 10 is detected by the abnormality detection unit 53 is described with reference to the flow chart of FIG. 2.

In Step S101, the relay control unit 52 determines whether or not an abnormality of the motor actuator 10 is detected by the abnormality detection unit 53.

The abnormality of the motor actuator 10 to be determined by the relay control unit 52 in Step S101 is an abnormality that requires interruption of power supply to the inverter 30 (motor unit 20). In other words, in Step S101, the relay control unit 52 determines whether or not interruption of power supply is required by the abnormality detection unit 53.

When the abnormality of the motor actuator 10 is not detected by the abnormality detection unit 53, the relay control unit 52 repeats the determination processing of Step S101. When the abnormality of the motor actuator 10 is detected by the abnormality detection unit 53, the relay control unit 52 proceeds to Step S102.

In Step S102, the relay control unit 52 outputs a command of switching the first solid state relay 41 in the solid state relay unit 40 from ON to OFF to bring the first solid state relay 41 into an OFF state, or outputs, to the drive control unit 51, a command of maintaining all of the field effect transistors 31 to 36 of the inverter 30 to OFF (in other words, a command of setting an ON duty ratio in the PWM control to 0%) to bring all of the field effect transistors 31 to 36 into the OFF state.

That is, the relay control unit 52 brings at least one of the first solid state relay 41 or the field effect transistors 31 to 36 into the OFF state, to thereby interrupt the power supply to the motor unit 20.

The first solid state relay 41 and the field effect transistors 31 to 36 each include a parasitic diode whose cathode is arranged on the battery 70 side. Accordingly, as long as the parasitic diode is in the OFF state, no power is supplied to the motor unit 20 via the parasitic diode.

In Step S102, the relay control unit 52 keeps the second solid state relay 42 in the ON state.

Further, the relay control unit 52 can select whether to bring one of the first solid state relay 41 and the field effect transistors 31 to 36 into the OFF state or to bring both of the first solid state relay 41 and the field effect transistors 31 to 36 into the OFF state depending on a portion at which the abnormality is detected by the abnormality detection unit 53.

Next, the relay control unit 52 proceeds to Step S103, and determines whether or not the rotational speed of the motor rotor 22 (hereinafter referred to as "motor rotational speed MRS") obtained based on an output signal of the motor rotation sensor 23 is equal to or smaller than a predetermined rotational speed THS.

When the motor rotational speed MRS exceeds the predetermined rotational speed THS, the relay control unit 52 repeats the determination of Step S103, and maintains the control of keeping the first solid state relay 41 or the field effect transistors 31 to 36 in the OFF state and keeping the second solid state relay 42 in the ON state.

Then, when the motor rotational speed MRS becomes equal to or smaller than the predetermined rotational speed THS, the relay control unit 52 proceeds to Step S104, and outputs a command of switching the second solid state relay 42 from ON to OFF to bring the second solid state relay 42 into the OFF state.

That is, when the power supply to the motor unit 20 is to be interrupted based on the abnormality detection, the relay control unit 52 brings the first solid state relay 41 into the OFF state or brings the field effect transistors 31 to 36 into the OFF state, and then brings the second solid state relay 42 into the OFF state.

In a case in which power supply to the motor unit 20 is required to be interrupted due to occurrence of an abnormality of the motor actuator 10, and thus the first solid state relay 41 and the second solid state relay 42 are brought into the OFF state, when the motor rotor 22 is rotated, a current caused by a counter-electromotive force generated by the motor unit 20 may be unable to be released to the battery 70 side, which may result in damaging circuit elements such as the inverter 30 and the driver 37.

In contrast, with the second solid state relay 42 being kept in the ON state, even when the first solid state relay 41 is in the OFF state, the current caused by the counter-electromotive force can be released to the battery 70 via the free-wheeling diodes D31, D33, and D35 of the field effect transistors 31, 33, and 35, the second solid state relay 42 in the ON state, and the first diode D41 of the first solid state relay 41. Thus, a voltage on the downstream of the first solid state relay 41 can be kept at the same level as a voltage of the battery 70, that is, a power source voltage.

That is, the relay control unit 52 is configured to bring at least one of the first solid state relay 41 or the field effect transistors 31 to 36 into the OFF state, and then bring the second solid state relay 42 into the OFF state. In this manner, while the power supply to the motor unit 20 is immediately interrupted to suppress driving of the motor actuator 10 in an abnormal state, the current caused by the counter-electromotive force generated by the rotation of the motor rotor 22 can be released to the battery 70, to thereby suppress damage on the circuit element due to the counter-electromotive force.

Here, the counter-electromotive force increases in proportion to the increase in the motor rotational speed MRS, and hence the relay control unit 52 determines that a counter-electromotive force at which the circuit element can withstand is generated based on the motor rotational speed MRS, and brings the second solid state relay 42 into the OFF state after the counter-electromotive force is sufficiently decreased.

That is, the predetermined rotational speed THS is a value adapted so as to allow determination on whether or not a counter-electromotive force at which the circuit element can sufficiently withstand is generated. For the predetermined rotational speed THS, a motor rotational speed MRS at which the counter-electromotive force becomes an absolute maximum rating of the circuit element is used as a reference.

In this manner, while a counter-electromotive force that may cause damage on the circuit element is generated, the second solid state relay 42 can be maintained in the ON state to release the current caused by the counter-electromotive force to the battery 70. In addition, after the counter-electromotive force decreases to an allowable level, the second solid state relay 42 can be promptly brought into the OFF state.

In other words, the relay control unit 52 is configured to determine the timing to turn off the second solid state relay 42 based on the motor rotational speed MRS. In this manner, the relay control unit 52 can determine, with high accuracy, a period in which the counter-electromotive force exceeds an allowable level and the second solid state relay 42 is required to be kept in the ON state, thereby being capable of keeping the second solid state relay 42 in the ON state without excess or deficiency.

Figure 2:
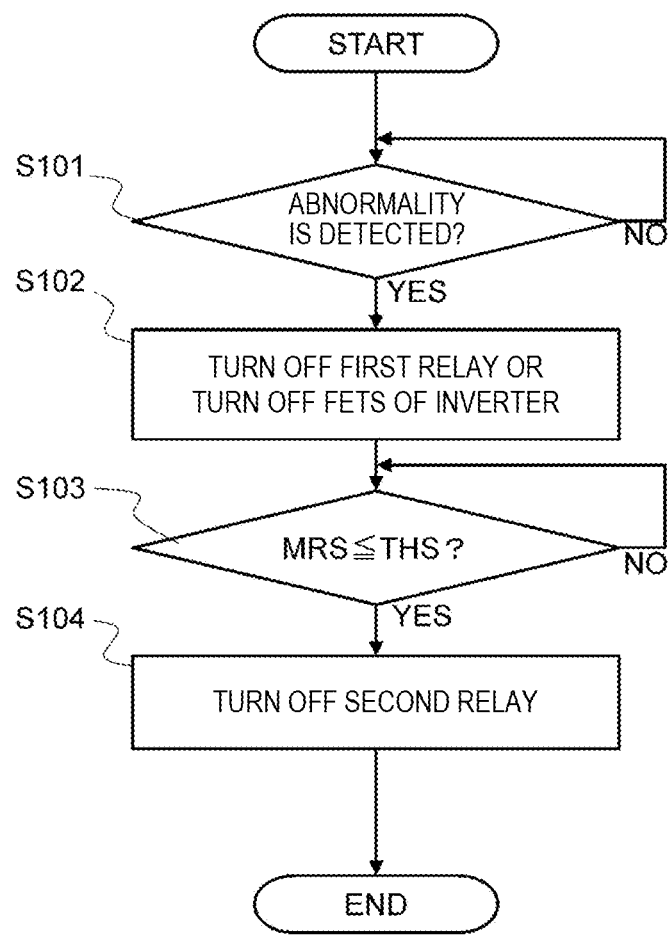
FIG. 2 is a flow chart for illustrating a procedure of relay control that is based on a motor rotational speed.

The processing of interrupting power supply performed by the relay control unit 52, which is illustrated in the flow chart of FIG. 2, is to be carried out based on the abnormality detection performed by the abnormality detection unit 53.

However, at the time of occurrence of a power interruption requirement when the motor actuator 10 has no abnormality, the relay control unit 52 can bring the first solid state relay 41 into the OFF state or bring the field effect transistors 31 to 36 into the OFF state, and then bring the second solid state relay 42 into the OFF state.

Further, in the electric power steering device, in some cases, a detection signal of a steering angle obtained by a steering angle sensor is acquired and used for motor control (control of the steering assist force). Further, a change speed of the steering angle correlates with the motor rotational speed MRS, that is, the counter-electromotive force.

Accordingly, the relay control unit 52 can determine the timing to turn off the second solid state relay 42, that is, the timing at which the counter-electromotive force is decreased to an allowable level, based on the change speed of the steering angle.

Further, in the electric power steering device, a right-left steering-angle change width is mechanically determined, and hence a high rotation state in which a counter-electromotive force exceeding the absolute maximum rating of the circuit element is generated is never maintained for a predetermined time period or more. That is, the cumulative number of revolutions at the time when the motor unit 20 rotates in one direction has an upper limit, and a time period in which high rotation that generates a counter-electromotive force exceeding an allowable level is maintained is determined in accordance with this cumulative number of revolutions corresponding to the upper limit.

Accordingly, instead of determining the timing to turn off the second solid state relay 42 based on the motor rotational speed MRS, the relay control unit 52 can infer that the counter-electromotive force falls below an allowable maximum level after an elapse of a predetermined time period from the timing at which the first solid state relay 41 is brought into the OFF state or the field effect transistors 31 to 36 are brought into the OFF state, and can turn off the second solid state relay 42 based on the inference.

Figure 3:
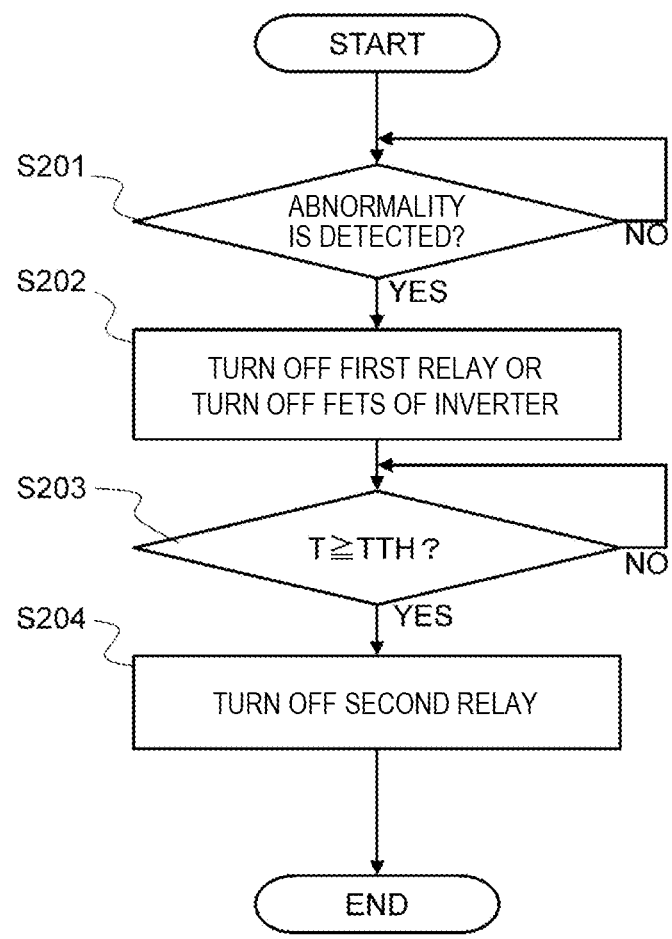
FIG. 3 is a flow chart for illustrating a procedure of relay control that is based on an elapsed time period.

The flow chart of FIG. 3 shows processing of interrupting power supply by the relay control unit 52, which is processing of determining the timing to turn off the second solid state relay 42 based on time measurement.

In Step S201, similarly to Step S101, the relay control unit 52 determines whether or not an abnormality of the motor actuator 10 is detected by the abnormality detection unit 53.

Then, when the abnormality of the motor actuator 10 is detected by the abnormality detection unit 53, the relay control unit 52 proceeds to Step S202, and, similarly to Step S102, brings the first solid state relay 41 into the OFF state or brings all of the field effect transistors 31 to 36 into the OFF state.

Next, the relay control unit 52 proceeds to Step S203, and determines whether or not an elapsed time period T from when the processing of turning off the first solid state relay 41 or the field effect transistors 31 to 36 is performed in Step S202 has reached a predetermined time period TTH.

The predetermined time period TTH is set with reference to a time period required for a steering to reach right and left ends at the motor rotational speed MRS at which an upper-limit counter-electromotive force at which the circuit element can withstand is generated.

That is, when the motor unit 20 rotates at high rotation that generates a counter-electromotive force exceeding the upper limit at which the circuit element can withstand, a time period (maximum steering time period) required for the steering to reach the right and left ends becomes shorter than the predetermined time period TTH.

Accordingly, when the elapsed time period T is shorter than the predetermined time period TTH, the relay control unit 52 can infer the possibility that a counter-electromotive force exceeding the upper limit at which the circuit element can withstand is generated, and when the elapsed time period T reaches the predetermined time period TTH, the relay control unit 52 can infer that there is achieved at least a state in which the counter-electromotive force is equal to or smaller than the upper limit.

When the elapsed time period T is shorter than the predetermined time period TTH, there is a possibility that a high rotation state in which a counter-electromotive force exceeding the absolute maximum rating of the circuit element is generated is maintained, and hence the relay control unit 52 waits without proceeding to Step S204.

Then, when the elapsed time period T reaches the predetermined time period TTH, that is, when the time period for which the first solid state relay 41 or the field effect transistors 31 to 36 are kept in the OFF state and the second solid state relay 42 is kept in the ON state reaches the predetermined time period TTH, the relay control unit 52 infers that there is not caused a high rotation state that generates a counter-electromotive force exceeding the absolute maximum rating of the circuit element, and proceeds to Step S204.

In Step S204, similarly to Step S104, the relay control unit 52 brings the second solid state relay 42 into the OFF state. That is, when the power supply to the motor unit 20 is to be interrupted based on the abnormality detection, the relay control unit 52 brings the first solid state relay 41 into the OFF state or brings the field effect transistors 31 to 36 into the OFF state, and then, after the elapse of the predetermined time period TTH, brings the second solid state relay 42 into the OFF state.

In this processing of interrupting the power supply, information related to the motor rotational speed MRS is not required in the relay control of the relay control unit 52, and control of releasing the current caused by the counter-electromotive force to the battery 70 can be performed in a simple and easy way.

When, in Step S102 or Step S202, the relay control unit 52 maintains the first solid state relay 41 in the ON state and brings all of the field effect transistors 31 to 36 of the inverter 30 into the OFF state, in Step S104 or Step S204, the relay control unit 52 brings the first solid state relay 41 into the OFF state simultaneously with the second solid state relay 42.

Further, when, in Step S102, Step S104, Step S202, or Step S204, the relay control unit 52 brings the first solid state relay 41 into the OFF state, the relay control unit 52 can simultaneously turn off the motor relay 60 (motor relays 61U, 61V, and 61W).

When, in Step S102 or Step S202, the relay control unit 52 brings the first solid state relay 41 and the motor relay 60 (motor relays 61U, 61V, and 61W) into the OFF state, the electric power steering device (on-vehicle equipment) can be prevented from being driven in an abnormal state, and generation of a brake force in the motor unit 20 can be rapidly suppressed.

However, when, in Step S102 or Step S202, the relay control unit 52 brings the first solid state relay 41 and the motor relay 60 into the OFF state, depending on a circuit configuration, the counter-electromotive force may sneak into a drive circuit of the motor relay 60, which may result in bringing the motor relay 60 into an incomplete ON state regardless of the OFF command.

When the motor relay 60 is brought into the incomplete ON state, an element resistance increases to increase a heat generation amount, which may result in causing damage on the motor relay 60.

In view of the above, in a case of a circuit configuration in which there is a possibility that the counter-electromotive force may sneak into the drive circuit of the motor relay 60 to bring the motor relay 60 into the incomplete ON state, when the relay control unit 52 brings the second solid state relay 42 into the OFF state, the relay control unit 52 can simultaneously bring the first solid state relay 41 and the motor relay 60 into the OFF state.

Figure 4:
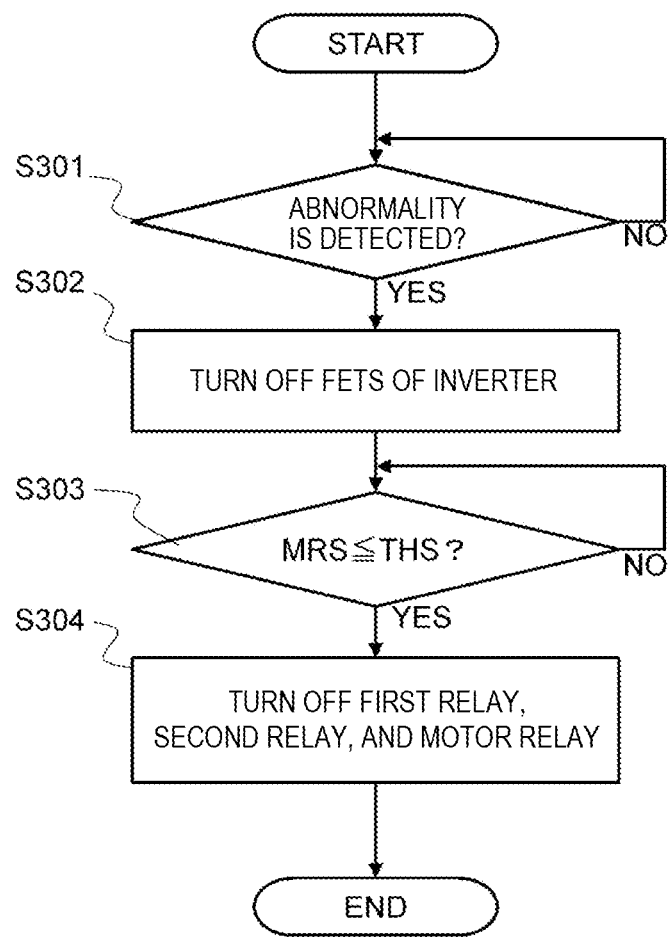
FIG. 4 is a flow chart for illustrating a procedure of relay control in which a first solid state relay, a second solid state relay, and a motor relay are simultaneously brought into an OFF state.

The flow chart of FIG. 4 shows processing of interrupting power supply by the relay control unit 52, which is processing of simultaneously bringing the first solid state relay 41, the second solid state relay 42, and the motor relay 60 into the OFF state.

In Step S301, the relay control unit 52 determines whether or not an abnormality of the motor actuator 10 is detected by the abnormality detection unit 53.

When the abnormality of the motor actuator 10 is not detected by the abnormality detection unit 53, the relay control unit 52 repeats the determination processing of Step S301. When the abnormality of the motor actuator 10 is detected by the abnormality detection unit 53, the relay control unit 52 proceeds to Step S302.

In Step S302, the relay control unit 52 maintains the first solid state relay 41 and the second solid state relay 42 in the ON state, and brings all of the field effect transistors 31 to 36 of the inverter 30 into the OFF state.

The relay control unit 52 brings all of the field effect transistors 31 to 36 into the OFF state to interrupt the power supply to the motor unit 20.

Further, even in a case in which the first solid state relay 41 is in the OFF state, the current caused by the counter-electromotive force can be caused to flow to the battery 70 side via the first diode D41, but the relay control unit 52 maintains the first solid state relay 41 and the second solid state relay 42 in the ON state so that the current caused by the counter-electromotive force can be caused to flow to the battery 70 side more smoothly.

Next, the relay control unit 52 proceeds to Step S303, and determines whether or not the motor rotational speed MRS is equal to or smaller than the predetermined rotational speed THS.

Here, in Step S303, instead of determining the motor rotational speed MRS, the relay control unit 52 can determine whether or not the elapsed time period T from when all of the field effect transistors 31 to 36 of the inverter 30 are brought into the OFF state based on the abnormality detection has reached the predetermined time period TTH.

When the motor rotational speed MRS exceeds the predetermined rotational speed THS (or when the elapsed time period T falls below the predetermined time period TTH), the relay control unit 52 repeats the determination of Step S303, and maintains the control of keeping the field effect transistors 31 to 36 in the OFF state and keeping the first solid state relay 41, the second solid state relay 42, and the motor relay 60 in the ON state.

Then, when the motor rotational speed MRS becomes equal to or smaller than the predetermined rotational speed THS (or when the elapsed time period T reaches the predetermined time period TTH), the relay control unit 52 proceeds to Step S304, and simultaneously brings the first solid state relay 41, the second solid state relay 42, and the motor relay 60 into the OFF state.

In this relay control, when interruption of the power supply to the motor unit 20 is required, the current caused by the counter-electromotive force generated by the motor unit 20 can be released to the battery 70 side, and the damage on the circuit element due to the counter-electromotive force can be suppressed.

Further, under a state in which the generation of the counter-electromotive force is sufficiently reduced, the first solid state relay 41, the second solid state relay 42, and the motor relay 60 are simultaneously brought into the OFF state, thereby being capable of rapidly preventing the electric power steering device (on-vehicle equipment) from being driven in an abnormal state.

Moreover, even in the circuit configuration in which there is a possibility that the counter-electromotive force may sneak into the drive circuit of the motor relay 60 to bring the motor relay 60 into an incomplete ON state, the relay control unit 52 maintains the motor relay 60 in the ON state under a state in which the counter-electromotive force is generated, thereby being capable of suppressing the occurrence of the incomplete ON state.

Accordingly, it is possible to suppress the increase in the element resistance and the damage on the motor relay 60 due to the generated heat because of each MOSFET of the motor relay 60 being brought into the incomplete ON state.

The technical ideas described in the above-mentioned embodiment can be combined as appropriate and used as long as there is no contradiction.

Further, although the details of the present invention are specifically described above with reference to the preferred embodiments, it is apparent that persons skilled in the art may adopt various modification modes based on the basic technical concepts and teachings of the present invention.

For example, the motor actuator for on-vehicle equipment may have a circuit configuration not including the motor relay 60.

Further, when the relay control unit 52 interrupts the power supply to the motor unit 20 based on the abnormality detection, the relay control unit 52 can set a waiting time period until the second solid state relay 42 is brought into the OFF state, based on the motor rotational speed at the time when the abnormality is detected, and can bring the second solid state relay 42 into the OFF state when the waiting time period has elapsed.

Further, in a motor actuator in which the motor unit 20 includes a plurality of sets of stator coils 21 and the inverter 30 and the solid state relay unit 40 are provided for each of the plurality of sets of stator coils 21, the relay control can be carried out independently for each of the plurality of systems.

Further, in the motor actuator 10 for the electric power steering device, the abnormality detection unit 53 can detect an abnormality of a sensor such as a steering torque sensor configured to detect a steering torque, and the relay control unit 52 can carry out control of interrupting power supply to the motor unit 20 based on the sensor abnormality.

That is, the present invention is not limited to the above-mentioned embodiment, and includes further various modification examples. For example, in the above-mentioned embodiment, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, and replace a part of the configuration of each of the embodiments.

The present application claims a priority based on Japanese Patent Application No. 2019-018574 filed on Feb. 5, 2019. All disclosed contents including Specification, Scope of Claims, Drawings, and Abstract of Japanese Patent Application No. 2019-018574 filed on Feb. 5, 2019 are incorporated herein by reference in their entirety.

REFERENCE SIGNS LIST 10 motor actuator, 20 motor unit, 21 stator coil, 22 motor rotor, 30 inverter, 31-36 field effect transistor, 40 solid state relay unit, 41 first solid state relay, D41 first diode, 42 second solid state relay, D42 second diode, 50 microprocessor, 51 drive control unit, 52 relay control unit, 53 abnormality detection unit, 60 motor relay, 70 battery

The invention claimed is:

1. A motor actuator for on-vehicle equipment, comprising:
a motor unit including a stator coil and a motor rotor;
an inverter, which is to be supplied with power from a battery of a vehicle to control current supply to the stator coil, and includes a bridge circuit including a plurality of field effect transistors, the plurality of field effect transistors each including a free-wheeling diode;
a solid state relay unit, which is provided between the battery and the inverter, and includes a first solid state relay and a second solid state relay,
the first solid state relay including a first diode,
the first diode including a cathode arranged on the battery side, and an anode arranged on the inverter side,
the second solid state relay including a second diode,
the second diode including a cathode arranged on the inverter side, and an anode arranged on the battery side; and
a microprocessor including a drive control unit and a relay control unit,
the drive control unit being configured to generate a drive command signal for controlling drive of the inverter,
the relay control unit being configured to bring, when supply of the power from the battery to the inverter is to be interrupted, the first solid state relay into an OFF state, or bring all of the plurality of field effect transistors into the OFF state, and then bring the second solid state relay into the OFF state.

2. The motor actuator for on-vehicle equipment according to claim 1, wherein the relay control unit is configured to bring the second solid state relay into the OFF state based on a rotational speed of the motor rotor.

3. The motor actuator for on-vehicle equipment according to claim 2, wherein the relay control unit is configured to bring the second solid state relay into the OFF state when the rotational speed of the motor rotor is equal to or smaller than a predetermined rotational speed.

4. The motor actuator for on-vehicle equipment according to claim 2,
wherein the motor unit includes a motor rotation sensor, wherein the motor rotation sensor is configured to detect the rotational speed of the motor rotor, and wherein the relay control unit is configured to determine the rotational speed of the motor rotor based on an output signal of the motor rotation sensor.

5. The motor actuator for on-vehicle equipment according to claim 1, wherein the relay control unit is configured to bring, when the supply of the power from the battery to the inverter is to be interrupted, the first solid state relay into the OFF state, or bring all of the plurality of field effect transistors into the OFF state, and then, after an elapse of a predetermined time period, bring the second solid state relay into the OFF state.

6. The motor actuator for on-vehicle equipment according to claim 1, further comprising a motor relay, wherein the motor relay is provided between the inverter and a neutral point of the stator coil, and wherein the motor relay is configured to switch between supply and interruption of current between the inverter and the neutral point.

7. The motor actuator for on-vehicle equipment according to claim 6, wherein the relay control unit is configured to bring, when the supply of the power from the battery to the inverter is to be interrupted, the first solid state relay into the OFF state and simultaneously bring the motor relay into the OFF state.

8. The motor actuator for on-vehicle equipment according to claim 6, wherein the relay control unit is configured to bring, when the supply of the power from the battery to the inverter is to be interrupted, all of the plurality of field effect transistors into the OFF state, and maintain the motor relay in an ON state.

9. The motor actuator for on-vehicle equipment according to claim 8, wherein the relay control unit is configured to bring, when the supply of the power from the battery to the inverter is to be interrupted, all of the plurality of field effect transistors into the OFF state, maintain the motor relay in the ON state, and also maintain the first solid state relay in the ON state.

10. The motor actuator for on-vehicle equipment according to claim 6, wherein the relay control unit is configured to bring, when the supply of the power from the battery to the inverter is to be interrupted, all of the plurality of field effect transistors into the OFF state, and then, when a rotational speed of the motor rotor is equal to or smaller than a predetermined rotational speed, simultaneously bring the first solid state relay, the second solid state relay, and the motor relay into the OFF state.

* * * * *